United States Patent [19]

Portelli et al.

[11] Patent Number: 4,750,886
[45] Date of Patent: Jun. 14, 1988

[54] ROD AND RETAINER BUSHING

[75] Inventors: Alfred L. Portelli, Waterford; Patrick G. Jarboe, Sterling Heights; Jeffrey L. Konchan, Warren, all of Mich.

[73] Assignee: General Motors Corporation, Detroit, Mich.

[21] Appl. No.: 116,574

[22] Filed: Nov. 4, 1987

[51] Int. Cl.⁴ .......................... F16C 11/06; F16D 1/12
[52] U.S. Cl. ...................................... 403/163; 403/71; 384/125
[58] Field of Search ...................... 403/69, 70, 71, 163, 403/162; 411/45; 384/125, 416

[56] References Cited

U.S. PATENT DOCUMENTS 3,033,624  5/1962  Biesecker ........................... 411/45 X
3,164,054  1/1965  Biesecker ........................... 403/163 X
3,415,155  12/1968  Riddell et al. ....................... 411/45 X

FOREIGN PATENT DOCUMENTS 1575271  11/1969  Fed. Rep. of Germany ........ 403/69

Primary Examiner—Andrew V. Kundrat
Attorney, Agent, or Firm—Arthur N. Krein

[57] ABSTRACT

A retainer bushing for securing a linkage rod to an apertured workpiece includes a head with a stepped shank portion extending therefrom with the shank having a relatively wide slot on one side thereof and the head and shank having a narrow slot extending axially therethrough diametrically opposite the wide slot forming a push-in type fastener. The retainer bushing is provided with an axial stepped defining a raised retainer bead in the shank portion having opposed inclined cam ramp surfaces on either side thereof. The linkage rod having at least at one end thereof a rod arm portion provided with a chamfered free end surface and, axially spaced from the chamfered free end, it is provided with an annular groove formed complementary to the retainer bead in the retainer bushing.

1 Claim, 2 Drawing Sheets

4,750,886

ROD AND RETAINER BUSHING

FIELD OF THE INVENTION

This invention relates to a fastener device and, in particular, to a linkage rod and a retainer bushing for operatively connecting the linkage rod to an apertured workpiece.

DESCRIPTION OF THE PRIOR ART

Retainer bushings are commonly used, for example, in the automotive industry to operatively retain at least one end, for example, of a linkage rod to an apertured workpiece which may, by way of an example, be the apertured flat end of a lever. Such retainer bushings, normally made of a suitable plastic material, are presently available in many configurations, including right-hand, left-hand or dual-hand configurations. Examples of the latter dual-hand configurations are disclosed in U.S. Pat. No. 3,033,624, entitled "Retainer Bushing", issued May 6, 1962 to Donald L. Biesecker and U.S. Pat. No. 3,164,054, entitled "Bushing with Rib and Shoulder Means", issued Jan. 5, 1965 to Donald L. Biesecker.

Although such plastic retainer bushings have been used with linkage rods to operatively connect levers for the transmission of mechanical motion in part, so as to facilitate the repair of various mechanical mechanism, such as door latches, it has been found that when such known dual-hand type retainer bushings are used, such plastic retainer bushings are either torn or totally destroyed while disconnecting the linkage rod from the associate lever. In either case, such a torn or destroyed retainer bushing must then be replaced during reassembly of the mechanism.

As should be apparent, the use of right-hand or left-hand retainer bushings increase the cost of the mechanisms in which they are used, both by the cost per se of such retainer bushings, the inventory cost and the cost in assembly time. This is due to the fact that, for example, in a door latch mechanism plural right-hand and left-hand retainer bushings may be used and normally cannot be interchanged with each other. Thus for example, if a right-hand retainer bushing is used at a location requiring a left-hand retainer bushing, mechanical interference may then occur between the right-hand retainer bushing and an adjacent element during movement of the linkage rod.

SUMMARY OF THE INVENTION

The present invention relates to a rod retainer bushing, made of a plastic material, which can be secured to an apertured workpiece and which can then receive the grooved end of a linkage rod to effect its retention to the workpiece while permitting pivotal movement of the linkage rod in more than one plane.

It is therefore a primary object of this invention to provide an improved rod and retainer bushing, the latter having a head and shank with a first axial extending slot in the shank and a second slot in both the shank and head to permit its easy assembly to an apertured workpiece and which is operable to axially retain a grooved linkage rod while still permitting repeated disassembly and reassembly of the linkage rod from the retainer bushing without any substantial decrease in the linkage rod holding power of the retainer bushing.

Another object of the invention is to provide an improved retainer bushing which is capable of being assembled to an apertured workpiece and used to axially retain an improved linkage rod while at the same time permitting such linkage rod to pivot about more than one axes, including its own.

A still further object is to provide an improved rod and retainer bushing, the retainer bushing being economically manufactured and assembled or disassembled with an improved linkage rod and which retainer bushing may be readily formed in one piece from suitable tough, resilient plastic materials.

For a better understanding of the invention as well as other objects and further features thereof, reference is had to the following detailed description of the invention to be read in connection with the accompany drawings.

DESCRIPTION OF THE PREFERRED EMBODIMENT

Figure 2:
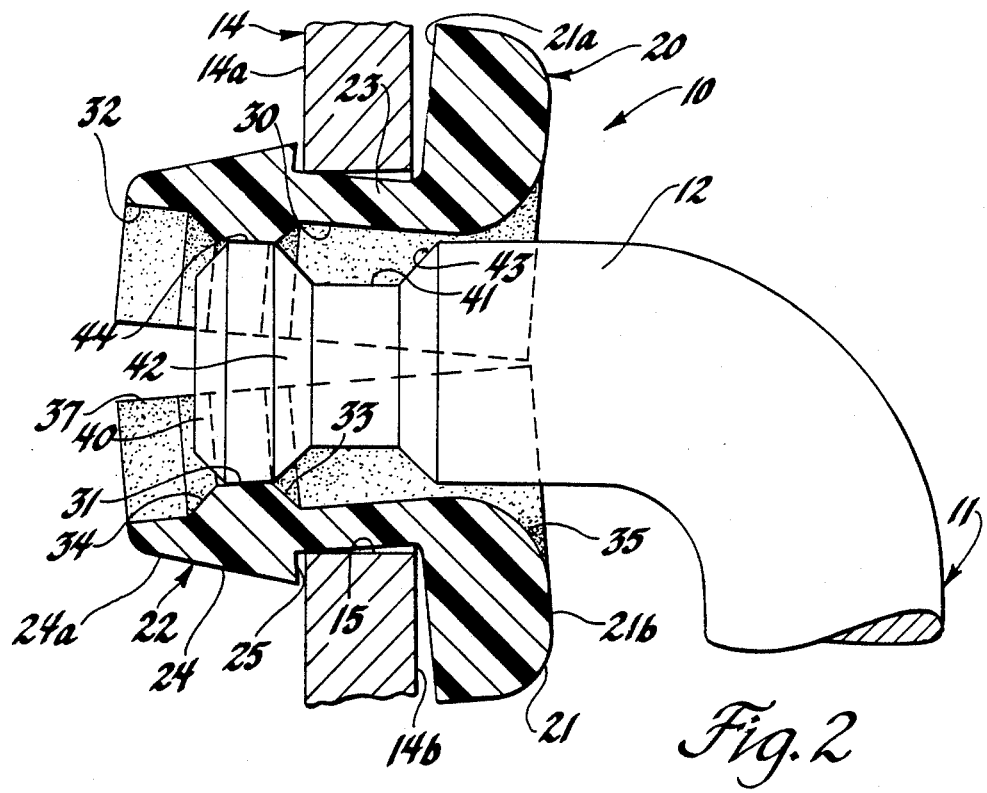
FIG. 2 is a view similar to FIG. 1 showing a linkage rod in a partially installed position in a retainer bushing already installed in a support member.
Figure 1:
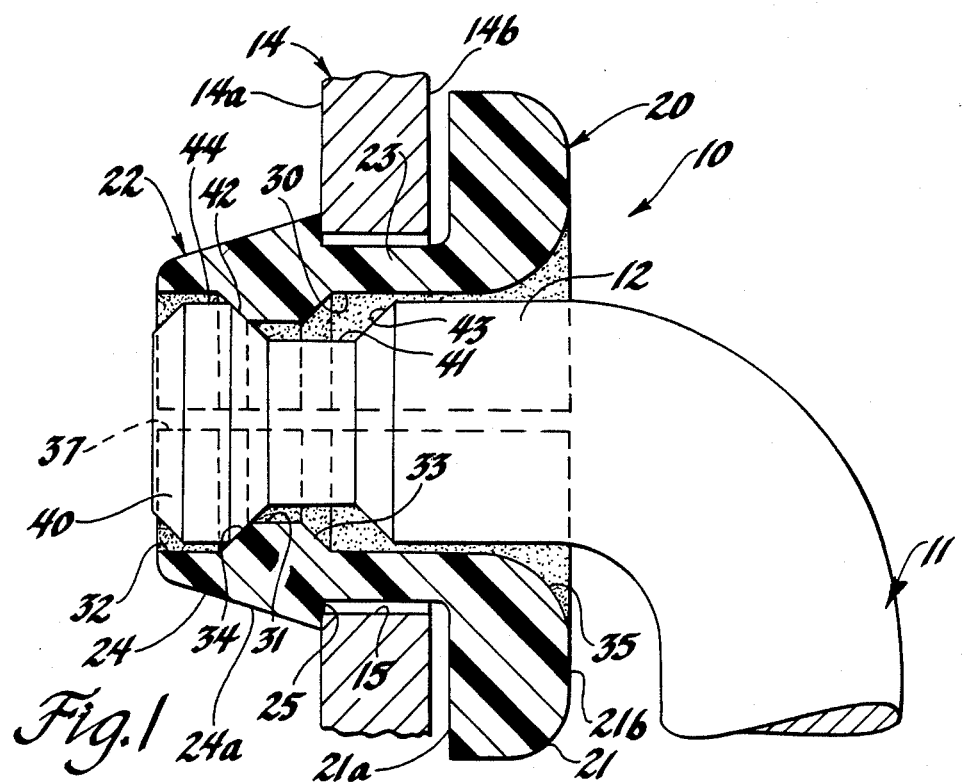
FIG. 1 is an elevational view in partial section of an assembly having a linkage rod and retainer bushing in accordance with the invention incorporated therein.

For purpose of illustration and description only, there is shown in FIGS. 1 and 2 a portion of a vehicle door latch mechanism, generally designated 10, which includes a linkage rod 11 having a short bent rod arm portion 12 on at least one end thereof that is operatively connected by a retainer bushing 20, constructed in accordance with the invention, to the flat end portion of a workpiece in the form of a lever 14, which may be either an actuator or actuated lever. An aperture 15 of a predetermined diameter is provided in the flat end portion of lever 14 adjacent to a free or one end thereof, the upper end with reference to FIGS. 1 and 2. This flat end portion of lever 14 may be of varying thickness within a predetermined range of thickness, with the flat inboard and outboard surfaces 14a and 14b, respectively, thereof being substantially parallel to each other.

It will be appreciated, however, that the above described elements can be used in a variety of control or linkage mechanisms, other than a door latch mechanism, for the transmission of mechanical motion.

The retainer bushing 20, formed of a suitable, tough, resilient plastic material, includes an enlarged, radially outward extending annular head 21 with an integral cylindrical shank 22 extending axially from the inboard shoulder 21a of the head 21.

The shank 22 includes an inboard portion 23 and a free end or outboard portion 24.

As shown, the inboard portion 23 is substantially of circular configuration and extends a predetermined axial extent from the inboard shoulder 21a and is connected by a radial outward extending flat shoulder means 25 to the outboard portion 24. This outboard portion 24 is of a frusto-conical configuration so as to define a radially inclined, flat cam ramp surface means 24a inwardly inclined from shoulder means 25. As best seen in FIG. 1, the free end of the frusto-conical outboard portion, as formed, has an effective nominal outer diameter that is a predetermined amount less than the internal diameter of aperture 15 in lever 14, whereby this end of the retainer bushing 20 can be easily inserted into the aperture 15.

As best seen in FIGS. 1 and 2, the effective outer diameter of the head 21 and of its inboard shoulder 21a is substantially greater than the effective outside diameter of the shoulder means 25, with this outside diameter of the shoulder means 25 itself being suitably greater than the inside diameter of the aperture 15 in the lever 14 for overlying opposite side of the apertured lever 14. Preferably and for a purpose to be described, the nominal effective outside diameter of the inboard portion 23 is a predetermined amount less than the inside diameter of aperture 15 in lever 14 and, the axial extent of this inboard portion 23 between the inboard shoulder 21a of head 21 and the shoulder means 25 is also preferably substantially greater than the maximum thickness of the lever 14, when used in a vehicle door latch mechanism.

The retainer bushing 20 is provided with an axial extending stepped bore therethrough so as to define in order starting from the head 21 a straight cylindrical first inner wall 30 having an internal diameter greater than the nominal outside diameter of the arm 12 of the linkage rod 11, a third inner wall 31 of a predetermined diameter less than that of wall 30, and an outboard or second inner wall 32 of a diameter corresponding to that of wall 30. Walls 30 and 31 are interconnected by an inclined shoulder 33 while walls 31 and 32 are interconnected by an inclined shoulder 34.

In the construction shown, the shoulders 33 and 34 are inclined about 40° to 50°, but preferably 45° relative to the axis of the stepped bore in the rod retainer bushing 20 so as to define a pair of oppositely facing cam ramp surface means, with these shoulders 33-34 and the inner wall 31 defining, in effect, a raised, substantially annular, retainer rib or bead 31, 33-34 in the retainer bushing 20 used to normally axially retain the rod arm portion 12 of the linkage rod 11 therein in a manner to be described. Preferably as shown, this rib or bead 31, 33-34 is axially located so as to be positioned in substantially the outboard shank portion 24 of the shank 22. Also as shown, the wall 30 is interconnected to the outboard shoulder 21b of the head 21 by a curved wall 35 to facilitate entry of the rod arm portion 12 into the retainer bushing 20.

Referring now to the linkage rod 11 and as best seen in FIGS. 1 and 2, its rod arm portion 12, in accordance with a feature of the invention, is provided at its free end with a chamfer so as to define a frusto-conical cam ramp 40 and, axially spaced a predetermined distance from this free end, the rod arm portion 12 is provided with an annular groove of a complementary shape to the rib or bead 31, 33-34 of the retainer bushing 20. This groove, as shown, thus includes a base wall 41 interconnected at its opposite ends to the nominal outer peripheral surface of the rod arm portion 12 by radially outward inclined ramp inboard or outboard shoulders or surfaces 42 and 43, respectfully, each formed at an angle corresponding to the angle of the shoulders 33 and 34 in the rod retainer bushing 20. As shown, the cam ramp 40 and the inboard surface 42 are interconnected by a flat circular collar 44 of the nominal outer diameter of the rod arm portion 12.

As best seen in FIG. 1, the axial extent of base wall 41 is preferably made substantially greater than that of wall 31 of the retainer bushing 20 and its outer diameter is a suitable amount less than the nominal diameter of this wall 31 of the retainer bushing 20. In addition the maximum outside diameter of the rod arm portion 12 is less than the internal diameter of the walls 30, 32 of the rod retainer bushing 20. With this arrangement the rod arm portion 12 is axially retained by the bead 31, 33, 34 and is also free to pivot about the axis of the rod retainer bushing 20 or of aperture 15 and thus linkage rod 11 is free to pivot a predetermined amount relative to lever 14 either clockwise or counterclockwise with reference to FIG. 1 to compensate for any misalignment of parts operatively interconnected by the linkage rod 11.

Figure 3:
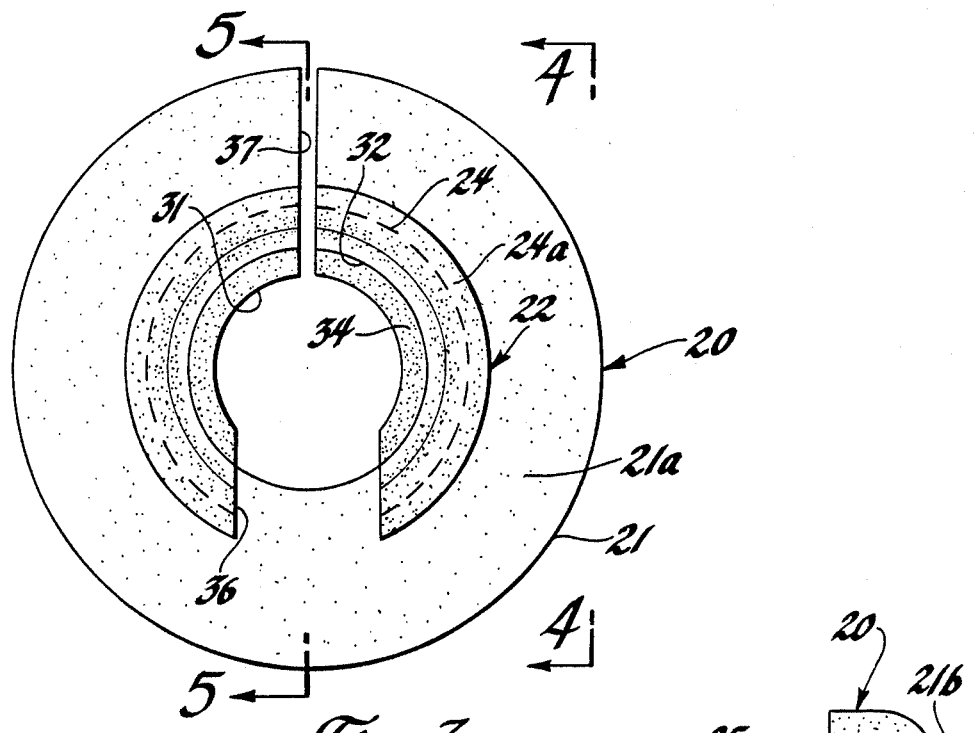
FIG. 3 is an end view from the stud end of the retainer bushing per se of FIG. 1.
Figure 5:
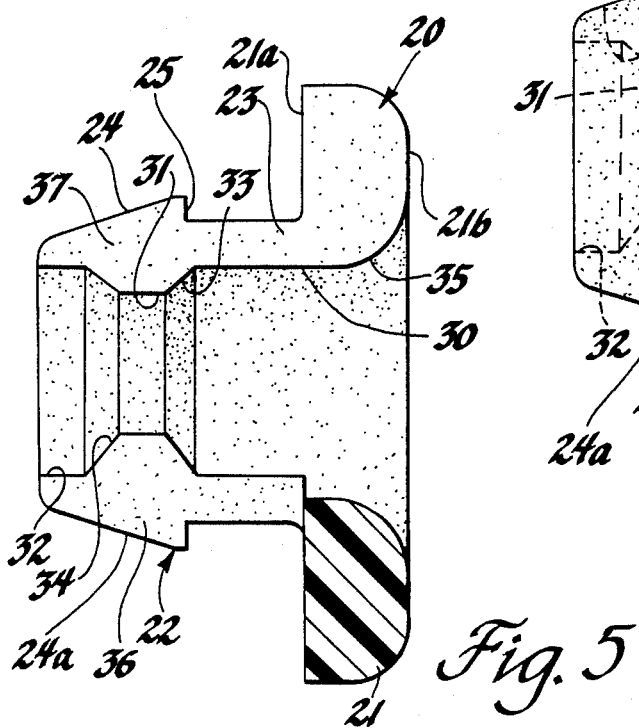

Referring now again to the retainer bushing 20, as another feature of the invention and as best seen in FIGS. 3 and 5, the shank 22 thereof is provided with a relatively wide slot or groove 36 that extends from the free end of the shank 22 to terminate next adjacent to the head 21 that is at inboard shoulder 21a and, diametrically opposite the slot or groove 36 there is provided a relatively narrow slot or groove 37 that extends axially the full way through both the shank 22 and head 21.

Figure 4:
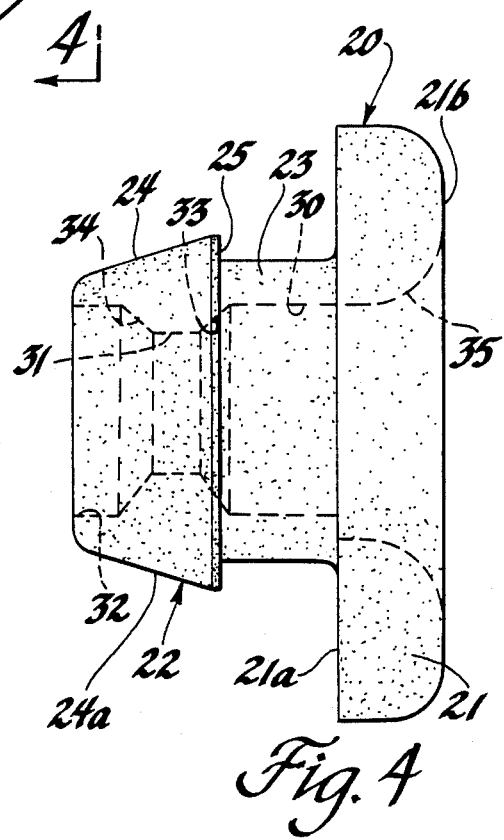
FIG. 4 is a side elevational view of the retainer bushing taken along lines 4—4 of FIG. 3; and, FIG. 5 is a cross-sectional view of the retainer bushing taken along lines 5—5 of FIG. 3.

These grooves 36 and 37 as provided in the shank 22, in effect, divides the shank into a two piece shank portion means with each such shank portion means thereof being of somewhat semi-circular configuration, as viewed from the free end of the shank 22 as seen in FIG. 3, with each such shank portion means thus being fee to flex either radially outward or inward from their nominal or as formed positions relative to the head 21, as shown in FIGS. 3, 4 and 5, while still being operatively retained together by the interconnection of these shank portion means to the head 21 Thus head 21 with the slot or groove 37 therethrough is thus actually substantially in the form of a split ring.

Now by way of an example, a retainer bushing 20 for use in a particular application was used to retain a linkage rod 11 having a nominal outer diameter of about 4.0 mm in a lever 14 having a 6.0 mm diameter aperture therethrough was formed with a slot or groove 36 that was about 1.6 mm wide while the slot or groove 37 was about 0.38 mm wide.

In this application, the diameter of walls 30 and 32 of the retainer bushing 20 was about 4.3 mm and wall 31 had an internal diameter of about 3.3 mm. In this application, the base wall 41 in the rod arm portion 12 of the linkage rod had an outer diameter of about 2.8 mm.

During assembly, the retainer bushing 20 is secured to the lever 14 by insertion of the shank 22 into the aperture 15. As the outboard shank portion 24 is forced into the aperture 15, the cam ramp surface means 24a of the shank will engage the inboard material of the lever 14 surrounding the aperture 15 so as to flex the shank portions radially inward so as to allow passage of the outboard shank portion 22 through the aperture 15 until the shoulder 25 has moved beyond the outboard surface 14b so as to then permit the shank portions to assume their as-formed positions as shown in FIG. 1.

After assembly of the retainer bushing 20 to the lever 14, the rod end portion 12 of the linkage rod 11 can be axially forced into the rod retainer bushing 20 in a direction to the left with reference to FIG. 2. As best seen with reference to FIG. 2, it should now be apparent that as the cam ramp 40 on the free end of the rod end portion 12 engages the cam ramp or inclined shoulder 33 of the rod retainer bushing 20 it will cause radial outward expansion of its shank portion 22 and slight deflection of its head 21 as shown. This movement then allows the collar 44 to be forcibly passed through the wall 31 portion of the retainer bushing 20 and moved to the assembled position of the rod arm portion 12 within the retainer bushing 20, the assembled position shown in FIG. 1.

If desired, in order to effect disassembly of the linkage rod 11 from the retainer bushing 20, a suitable tool, such as the end of a screwdriver can be inserted between the linkage rod 11 and the outboard surface 21 of the retainer bushing 20 and thus it can be used like a pry bar to apply an axial load to the right, with reference to FIGS. 1 and 2, on the rod end portion 12 so as to cause its cam surface 42 to engage the cam ramp means or shoulder 34 of the retainer bushing 20 whereby to cause the shank portion 22 thereof to expand radially outward, as shown in FIG. 2, so as to then allow removal of the rod end portion 12.

In the above-described particular linkage rod 11 and retainer bushing 20 application, it was found that an axial load of about 5 pounds was required to effect such disassembly even after repeated assembly and disassembly operations. Thus in this particular application, there was little or no effective reduction of the rod end portion 12 retention or holding force of the subject retention bushing 20 and that holding force was substantially greater than that of any known commercially available, plastic rod retainer bushings.

While the present invention, as to objects and advantages, has been described herein as carried out in a specific embodiment thereof, it is not desired to be limited thereby but it is intended to cover the invention broadly within the spirit and scope of the appended claim.

The embodiments of the invention in which an exclusive property or privilege is claimed are defined as follows:

1. In an assembly of the type including a workpiece having an aperture therethrough, a retainer bushing of the push in type operatively fixed to the workpiece and extending through the aperture therein and a linkage rod having a rod end portion thereof fixed in the bushing retainer for pivotal movement about the axis of the aperture, the improvement wherein said retainer bushing includes a head having an inboard shoulder of a size overlying one side of the aperture in the workpiece, and an integral cylindrical shank extending axially from said inboard shoulder of said head, said shank including a inboard portion next adjacent to said head and a frusto-conical outboard portion, said inboard portion having a nominal external diameter that is a predetermined amount smaller than the internal diameter of the aperture, and a radial outward extending flat shoulder, of a size for overlying an opposite side of the aperture interconnecting said inboard portion to said outboard portion, said retainer bushing having an axial stepped bore therethrough defining a cylindrical first and second inner walls extending from opposite ends of said retainer bushing and an intermediate radial inward extending rib means located in said outboard portion and defining a pair of oppositely facing cam ramp surface means and an interconnecting third inner wall of a internal diameter less than the internal diameter of said first and second inner walls; a relatively wide first slot extending axially through said shank and a narrow second slot, located diametrically opposite said first slot extending axially through both said shank and said head; and, wherein said linkage rod, of a predetermined diameter less than that of said first and second inner walls, has a rod arm portion with a chamfered surface at its free end to define a frusto-conical cam ramp, said rod arm portion further including an annular groove axially spaced from said chamfered surface of a complementary shape to said rib means so as to define a pair of axially spaced apart opposed cam ramp shoulders and an interconnecting base wall having an external diameter less than the internal diameter of said third inner wall.

* * * * *